United States Patent [19]

Lackner

[11] Patent Number: 5,007,379
[45] Date of Patent: Apr. 16, 1991

[54] AIR CIRCULATING SYSTEM FOR POULTRY HOUSING

[75] Inventor: Karl H. Lackner, Ittlingen, Fed. Rep. of Germany

[73] Assignee: Firma Salmet Gesellschaft mit Beschrankter Haftung & Co., Kommanditgesellschaft, Ittlingen, Fed. Rep. of Germany

[21] Appl. No.: 493,747

[22] Filed: Mar. 15, 1990

[30] Foreign Application Priority Data

Mar. 15, 1989 [DE] Fed. Rep. of Germany ....... 3908336

[51] Int. Cl.$^5$ ............................................. A01K 31/00
[52] U.S. Cl. ........................................ 119/17; 119/15
[58] Field of Search ................. 119/16, 17, 18, 19, 119/30, 31

[56] References Cited

U.S. PATENT DOCUMENTS

| 2,734,444 | 2/1956 | Lunn, Jr. et al. | 119/31 |
| 3,139,858 | 7/1964 | Martin | 119/31 |
| 3,244,359 | 4/1966 | Holland | 119/15 |
| 3,695,232 | 10/1972 | Frank | 119/17 |
| 4,173,947 | 11/1979 | Whiteside, Jr. | 119/18 |
| 4,249,482 | 2/1981 | Harr | 119/17 |
| 4,299,191 | 11/1981 | White et al. | 119/17 |
| 4,343,261 | 8/1982 | Thomas | 119/17 |

Primary Examiner—Paul J. Hirsch
Attorney, Agent, or Firm—Antonelli, Terry, Stout & Kraus

[57] ABSTRACT

A drive mechanism for an air circulating system for a battery of poultry cages for housing poultry, with the air circulating system including air ventilator flaps pivotally suspended in chambers. The drive mechanism includes traction members driven in a reciprocating fashion, with the traction members including compression springs surrounding the respective traction members.

14 Claims, 3 Drawing Sheets

AIR CIRCULATING SYSTEM FOR POULTRY HOUSING

TECHNICAL FIELD

The present invention relates to a circulating system and, more particularly, to a drive mechanism for an air circulating system of a battery of cages for housing poultry.

In practical farming of laying hens, a drying of poultry droppings is an expedient, with the drying step being performed by blowers; however, a disadvantage of this approach resides in the fact that considerable constructional expenditures are required and the use of blowers results in a substantial energy consumption. Moreover, difficulties are encountered with the drawn in fresh air which can lead to a formation of condensation.

To avoid the disadvantages encountered with the above proposal, a substantial improvement is proposed in, for example, DE 37 15 735 A1 which employs fan flaps and pivot drives.

More particularly, in the last mentioned proposed arrangement, a battery of cages for housing poultry is proposed wherein at least two adjacently arranged horizontal rows of cages have disposed therebetween a poultry dropping receptacle and a waste belt, with an air circulating system being associated with a receptacle in order to dry the collected poultry droppings. The air circulating system produces air currents adapted to sweep over the poultry dropping receptacle, with the air circulating system including a plurality of air ventilator flaps arranged above the poultry dropping receptacle. The air ventilator flaps are distributed at longitudinal intervals and supported on transverse axles, with the air flaps being associated with pivot drives combined at least into groups, for pivoting the air ventilator flaps. The air ventilator flaps, in a central position of the pivot drives, are substantially perpendicularly oriented and, the pivot drive includes traction elements extending in a longitudinal direction of the battery of poultry cages and engaging the air ventilator flaps at a small spacing from the transverse axles of the air ventilator flaps. The traction elements are jointly reciprocably drivable, each with a mutual phase shift, and at least in groups.

Pivot drives utilized for the above described purpose in poultry housings employ pull and push rods or two oppositely working rods which are solely pull rods. A disadvantage of this approach resides in the fact that the drive mechanisms exhibit large inertial forces and, above all, considerable elongations result for the pull rods during operation due to the considerable length of the batteries of cages thereby resulting in non-uniform operation and considerable vibrations of the entire system.

SUMMARY OF THE INVENTION

The aim underlying the present invention essentially resides in providing a drive mechanism for a battery of poultry cages, which drive mechanism has satisfactory operating characteristics, is simple in construction and has a low energy requirement.

In accordance with advantageous features of the present invention, at least one spring means is arranged on each of the traction elements, with the at least one spring means acting in a direction opposite to a drive force.

The spring means are, in accordance with the present invention, advantageously constructed so that the traction elements are always under a suitable tensile stress even during a return movement thereby bringing about a uniform elongation of the traction element and, consequently, permitting an initial adjustment of the contact elements of the fan flaps at the traction elements to a suitable spacing taking the pretensioning into account.

By virtue of the fact that the pretensioning remains essentially the same, and by virtue of the fact it is possible to utilize traction ropes or cables for the traction elements, irregularities due to minor additional elongations of the traction element are no longer significant.

The traction ropes or cables forming the traction elements may be temporarily slightly compressed during operation without impairing the operating properties or can be temporarily relieved of tensile stress to a slight degree.

In accordance with the present invention, it is necessary only for a single traction element to be provided for a given row of poultry cages in order to attain a satisfactory operating drive mechanism.

The several traction elements of different groups of poultry cages may be coupled with a phase shift and, consequently, the spring means have no appreciable effect on the entire amount of energy expended since the compression of one spring means or group of spring means is readily compensated by the release of the spring force of the other spring means.

By virtue of the utilization of a drive mechanism constructed in accordance with the present invention, it is possible to save about two-thirds of the energy consumed for a blow-drying operation of the poultry droppings and to provide a more favorable climate in the respective poultry cages so as to achieve an even better drying action.

Advantageously, in accordance with the present invention, a relatively strong spring is arranged at an end of each battery of poultry cages facing away from a driving side thereof while, depending upon a length of the battery of poultry cages, additional spring means may be provided at corresponding intermediate positions so that the respective traction elements are under approximately identical tensile forces over an entire length thereof and the springs need not be of a large dimension.

With the arrangement of the present invention, the spring means may be fashioned as compression springs and can be disposed so as to surround the traction elements.

Additionally, the spring means may, in accordance with the present invention, exhibit differing spring forces, diameters, and/or have differing lengths.

Furthermore, the drive action of the driving mechanism of the present invention may be provided with drive members so as to provide traction forces in a vibration fashion.

While a number of reciprocating drive means can be utilized as the drive mechanism for a drive end of the traction elements, in accordance with the present invention, rocking levers may be provided which are driven by eccentrics or cam disc means.

Additionally, in order to enable a placing of the entire system in a suitable phase position during a drive operation, taking the spring forces and dimensions into account, in accordance with further features of the present invention, the drive mechanisms are suitably equipped with angular adjustment clutches.

BRIEF DESCRIPTION OF THE DRAWINGS:

The above and other objects, features, and advantages of the present invention will become more apparent from the following description when taken in connection with the accompanying drawings which show, for the purpose of illustration only, one embodiment in accordance with the present invention, and wherein.

DETAILED DESCRIPTION

Figure 1:
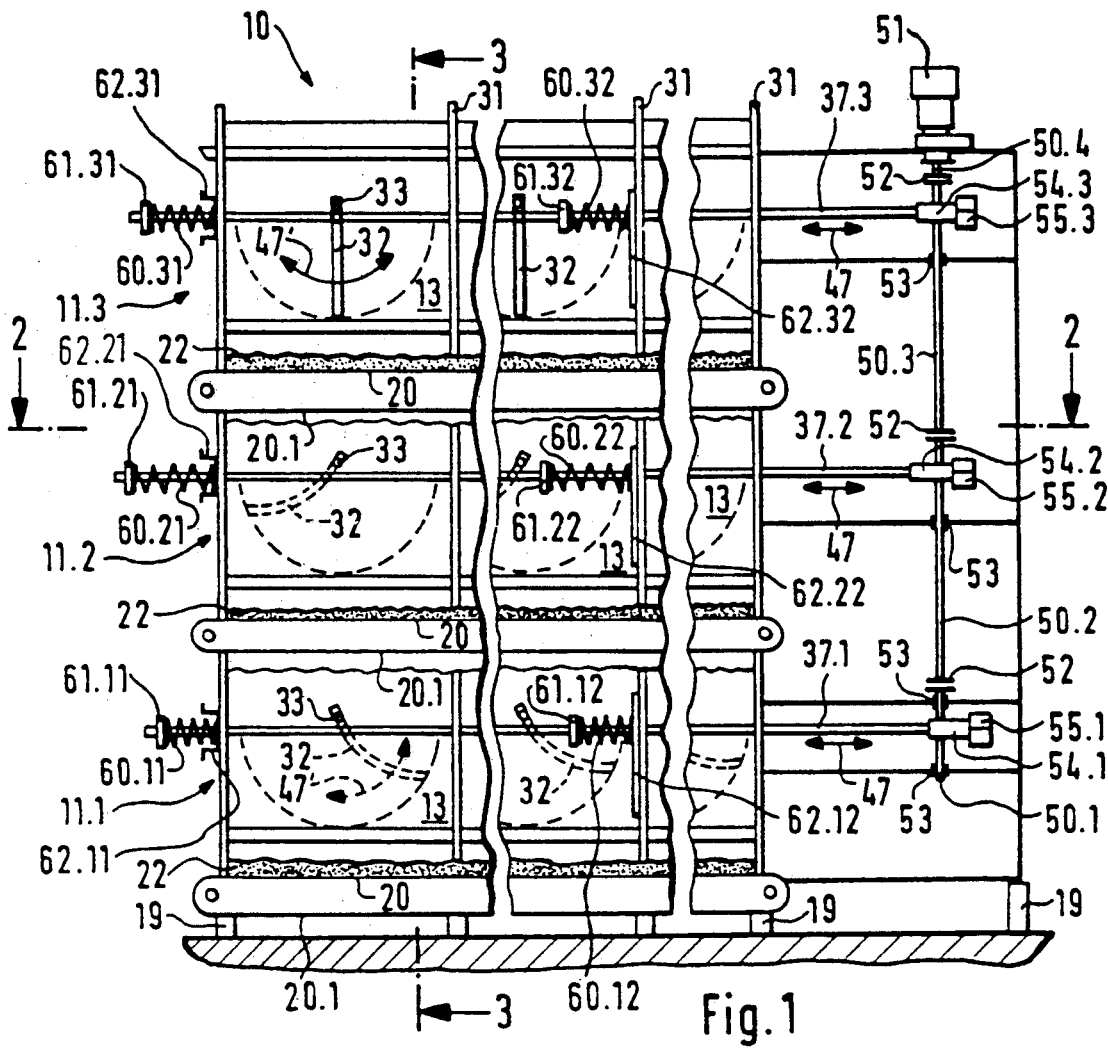
FIG. 1 is a partially schematic lateral view of a portion of a battery of poultry cages employing an air circulation system having a drive mechanism constructed in accordance with the present invention.
Figure 3:
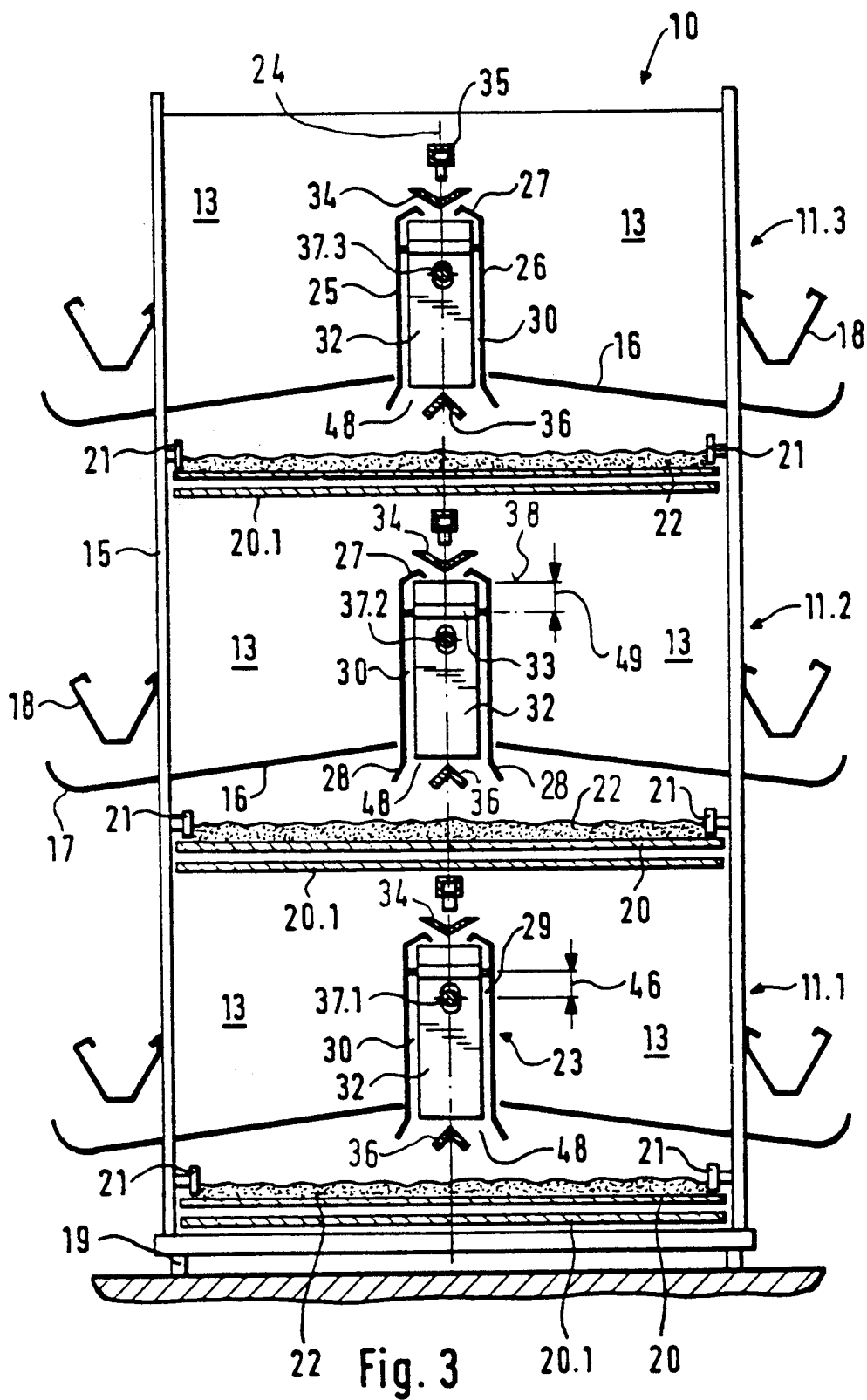
FIG. 3 is a schematic vertical sectional view taken along the line III—III in FIGS. 1 and 2.

Referring now to the drawings wherein like reference numerals are used throughout the various views to designate like parts and, more particularly, to FIGS. 1 and 3, according to these figures, a battery generally designated by the reference numeral 10 of poultry cages 13 includes, for example, six horizontally extending cage rows generally designated by the reference numerals 11.1, 11.2, 11.3 arranged in three tiers one above the other, with two cages 13 being present in each tier and respectively forming one double row of cages 13, with the individual cages 13 each abutting in pairs along a rear side thereof.

Each cage 13 includes a floor grating 16 sloping downwardly from a rear side 14 of the cage 13 to a front side 15 thereof, with the floor grating 16 projecting beyond the front side 15 of the cage 13 and forming an egg collecting chute 17. A feeding trough 18 is provided above the egg collecting chute 17, with the feeding trough 18 extending, as with the egg collecting chute 17, over an entire length of the cage rows 11.1, 11.2, 11.3.

The battery 10 of cages 13 is supported by feet 19 respectively located in a zone of the front side 15 of the cages 13 between neighboring cages 13 of the two bottom cage rows 11.1. As can readily be appreciated, the batteries 10 of cages 13 may also contain more than three tiers, and a greater number of rows of cages than six. Normally, the batteries 10 of poultry cages 13 have a length of, for example, fifty meters or more. Each cage row 11.1, 11.2, 11.3 of poultry cages 13 includes a belt 20 for receiving poultry droppings, with the belt 20 forming a waste receptacle extending at a distance beneath the oppositely inclined floor gratings 16 of the two cages 13 of the individual cage rows 11.1, 11.2, 11.3. Fixedly mounted upwardly projecting marginal boundaries 21, extending in a longitudinal direction through the battery 10 of cages 13, are disposed along two opposed belt edges on the front sides 15 of the cages 13. The waste belt 20 constructed, for example, as an endless rotating belt, catches the poultry droppings 22 falling through the floor gratings 16 and permits a discharge of the poultry droppings 22 as waste from an end of the run of the waste belt 20. The empty returning belt portion 20.1 is illustrated in the figures schematically without any guide rollers.

Each of the cage rows 11.1, 11.2, 11.3, containing twin cages 13, is provided with an air circulating system 23 which is arranged, as shown most clearly in FIG. 3, essentially on both sides of a longitudinal plane of symmetry 24 of the battery 10 between the cages 13 which are adjacent to each other at the rear sides thereof. The air circulating system 23 includes two substantially perpendicularly arranged longitudinal walls 25, 26 extending on opposite sides of the longitudinal central plane of symmetry 24 in parallel over an entire row 11.1, 11.2, 11.3 of the cages 13. The longitudinal walls 25, 26 each include top edge strips 27 which are angled inwardly toward the longitudinal plane of symmetry 24; whereas, the bottom of the longitudinal walls 25, 26 include bottom edge strips 28 which are angled toward the outside or away from the longitudinal plane of symmetry 24.

The longitudinal walls 25, 26 each form a part of the rear sides 14 of the cages 13 and enclose a longitudinally extending duct 29 which is subdivided into individual chambers 30 exhibiting a narrow opening along a top side thereof between the edge strips 27. The individual chambers 30 are open in a downward direction between the edge strips 28. Partition means 31 are provided for subdividing the duct 29 into the individual chambers 30, with the partition means 31 being spaced from each other in a longitudinal direction of the duct 29. Thus, each pair of poultry cages 13 is provided with its own individual chamber 30, with the rows of chambers 30 extending in a longitudinal direction over an entire length of the battery 10 of poultry cages 13.

A substantially flat air ventilator flap 32 is supported in each individual chamber 30 by a transverse axle 33, with the ends of the transverse axle 33 being respectively supported or mounted on the longitudinal walls 25, 26. In the illustrated embodiment, the transverse axle 33 is located in a region of an upper end of the air ventilator flap 32 at a small distance 49 from a top edge thereof. Therefore, normally, the air ventilator flap 32 will hang due to its inherent weight in a perpendicular position between the longitudinal walls 25, 26, with a small gap width with respect to the walls 25, 26.

As shown most clearly in FIG. 3, the openings at the top end of the individual chambers 30 are covered by a longitudinally extending molding 34 arranged, as a chute, beneath a longitudinal pipe 35, with the longitudinally extending molding 34 extending in the longitudinal plane of symmetry 24 through the entire respective rows 11.1, 11.2, 11.3 of the poultry cages 13. A longitudinally extending angular air flow divider 36 is associated with the open bottom end of the individual chambers 30, with the air flow divider 36 being arranged at a small spacing beneath the downwardly hanging air ventilator flaps 32. The air flow divider 36 is also disposed in the longitudinal plane of symmetry 24 and extends over an entire length of the respective rows 11.1, 11.2, 11.3 of the poultry cages 13 thereby creating two exhaust openings 48 disposed on respective sides of the longitudinal plane of symmetry 24.

The drive mechanism includes a pivot drive means for pivoting the air ventilator flaps 32 in the individual chambers 30, with the pivot drive means for each cage row 11.1, 11.2, 11.3, including, as a traction means, a rope or cable 37.1, 37.2, 37.3. The rope or cable 37.1, 37.2, 37.3 respectively extends in an upper zone of the respective duct 29 in the longitudinal plane of symmetry 24 along the entire length of the respective rows 11.1, 11.2, 11.3 of the poultry cages 13. The traction rope or cables 37.1, 37.2, 37.3 are respectively articulated to the air ventilator flaps 32 at a small spacing 46 (FIGS. 3 and 4) beneath the transverse axles 33 of each air ventilator flap 32 of the respective double row of poultry cages 13, with the respective traction ropes or cables 37.1, 37.2, 37.3 being adapted to be moved to and fro in a direction of a longitudinal extension of the respective traction elements as indicated by the double arrows 47 in FIGS. 1 and 2. The reciprocatory motion of the ropes or cables 37.1, 37.2, 37.3 results in a pivoting of the air ventilator flaps 32 in a direction of the double arrow 47'.

Figure 4:
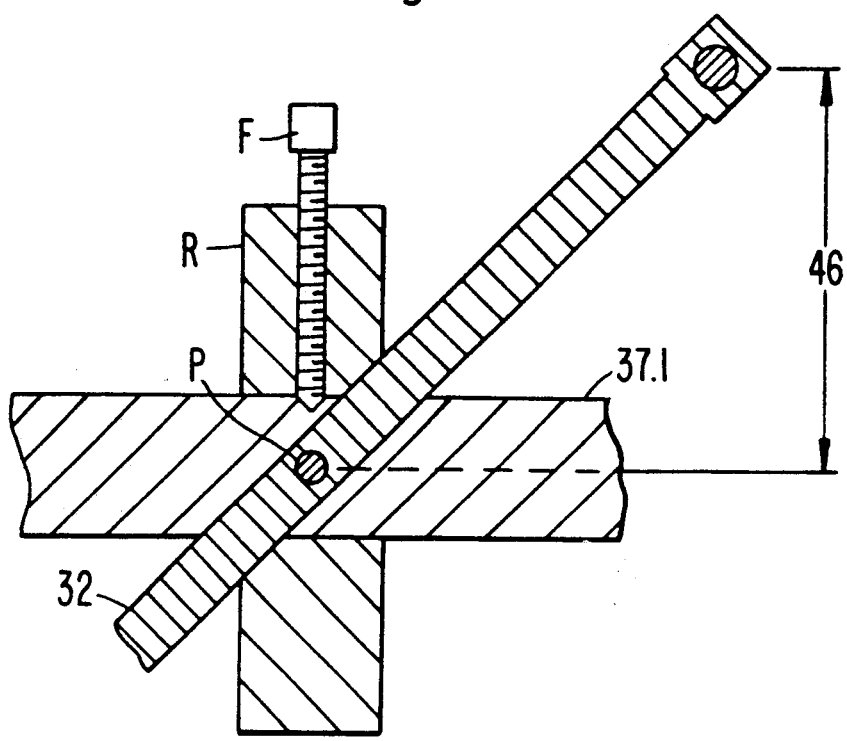
FIG. 4 is a partial cross-sectional view, on an enlarged scale, of an example of an articulated connection between a traction element and ventilating flap.

As shown in FIG. 4, the articulation between the air ventilator flaps 32 may be achieved by, for example, providing a ring member R adapted to surround the traction ropes or cables, for example, rope or cable 37.1, with an adjustment fastener F such as, for example, a set screw, being received in the ring member R, with a point thereof being adapted to bite into the rope or cable 37.1. Horizontal pin P projecting outwardly from the ring member R may be provided on opposite sides of the ring member R to engage bearing holes (not shown) in the respective air ventialtor flaps 32. As can readily be appreciated the fastener F can be arranged above or below the cable 37.1 and, if desired, more than one fastener F may be utilized.

Figure 2:
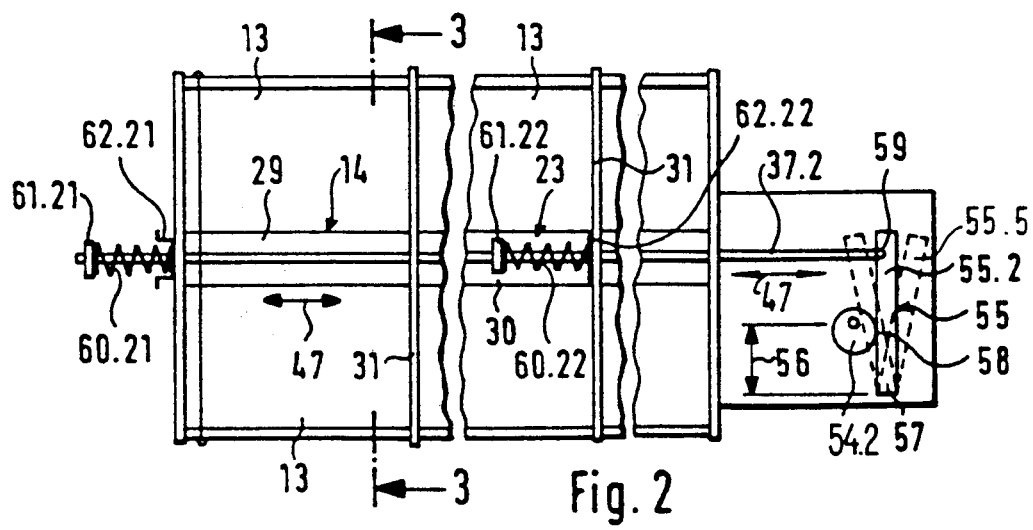
FIG. 2 is a schematic horizontal sectional view taken along the line II—II in FIG. 1.

In the illustrated embodiment, three traction elements in the forms of ropes or cables 37.1, 37.2, 37.3 are provided; however, it is understood that the number of traction ropes or cables 37.1, 37.2, 37.3 would be dependent upon the number of poultry cages 13 in the battery 10; however, in each case the traction ropes of cables 37.1, 37.2, 37.3 are driven jointly on an end face of the battery 10 of the poultry cages 13 by way of the drive mechanism disposed at the right hand side in FIGS. 1 and 2.

As shown most clearly in FIGS. 1 and 2, the drive mechanism includes a joint drive shaft fashioned of a plurality of shaft sections 50.1, 50.2, 50.3, 50.4, with the respect shaft sections being connected to one another by suitable conventional couplings 52 so as to enable a relative positioning of the shaft sections 50.1, 50.2, 50.3, 50.4, with respect to one another to be adjustable and lockable in an adjusted position. The joint drive shaft is supported in pivot bearings 53 and is adapted to be driven by a geared motor 51.

The drive mechanism further includes eccentric disc or cam means 54.1, 54.2, 54.3 respectively non-rotationally mounted to the shaft sections 50.1, 50.2, and 50.3. Each eccentric disc or cam means, as shown in FIGS. 1 and 2, is respectively associated with one eccentric rocking lever 55.1, 55.2, 55.3, with the respective rocking levers being arranged at a spacing 56 (FIG. 2) from the drive shaft so as to be pivotable by a bearing 57. The rocking levers 55.1, 55.2, 55.3 are maintained in a loose contact by a suitable support structure with a contact zone 58 (FIG. 2) on the respective eccentric discs or cams 54.1, 54.2, 54.3 on a side facing away from the poultry cages 13. The respective rocking levers 55.1, 55.2, 55.3 are constructed as dual arms each including a short arm and a longer arm section 55.5 extending to a contact bearing 59 where the end of the respective traction ropes or cables 37.1, 37.2, 37.3 is supported, preferably in a length-adjustable manner.

Each traction rope or cable 37.1, 37.2, 37.3 includes, in the illustrated embodiment, two compression springs 60.11, 60.12; 60.21, 60.22; and 60.31, 60.32, corresponding to the rows 11.1, 11.2, 11.3 of the poultry cages 13. The traction ropes or cables 37.1, 37.2, 37.3 extend through the respective compression springs, with the terminal ends of the respective springs being supported on the respective traction ropes or cables 37.1, 37.2, 37.3 by traction means spring bearings 61.11, 61.12, 61.21, 61.22, 61.31, 61.32.

The opposite ends of the respective springs 60.11, 60.12; 60.21, 60.22; and 60.31, 60.32, facing the respective eccentric disc or cams 54.1, 54.2, 54.3 rests on fixed bearings 62.11, 62.12, 62.21, 62.22, 62.31, 62.32. Advantageously, the fixed bearings 62.11, 62.12, 62.21, 62.22, 62.31, are fashioned as spring-loaded cover means. The spring bearings 61.11, 61.12, 61.21, 61.22, 61.31, 61.32 are preferably provided with a readjustment means such as, for example, nuts N, counternuts, wedge structures, split clamping plates of the like.

Figure 5:
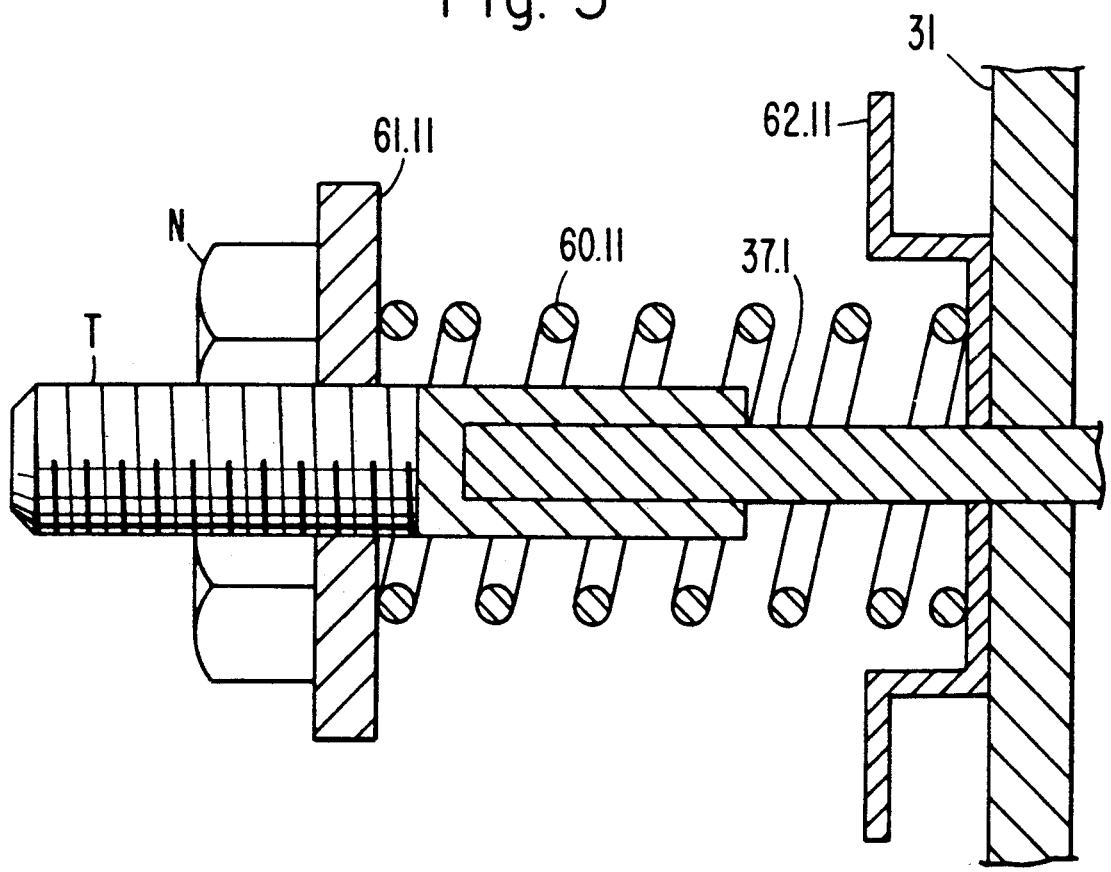
FIG. 5 is a partial cross-sectional view, on an enlarged scale, of an example of a terminal mounting arrangement for a traction element.

For example, as shown most clearly in FIG. 5, the terminal ends of the respective traction cables or ropes, for example, cable or rope 37.1 in FIG. 5, may be provided with a threaded rod T attached to the end of the rope or cable 37.1 by, for example, soldering. The threaded rod T is adjustable by adjustment of the nut N bearing against the spring bearing plate 61.11. As can readily be appreciated other cable fastening approaches may be utilized such as interweaving individual strands, utilizing a rope or disc member such as, for example, the ring member R, slipped over the end of the rod T with a cross pin (not shown) being inserted into an opening in the rod T thereby dispensing with the need for threads. The compression springs 60.12, 60.22, 60.32 may be arranged by providing a suitable ring member similar to the ring member R through which the respective cable or rope could be inserted, with a locking screw similar to the fastener F being employed to press against the rope or cable.

In the embodiment illustrated in FIGS. 1 and 2, the springs 60.11, 60.21, and 60.31, are larger and stronger than the compression springs 60.12, 60.22, 60.32, and, in each case, the compression springs 60.11, 60.21, 60.31 are provided at the left hand end of the battery 10 of poultry cages 13 in the illustrated embodiment, with the latter springs providing the primary traction force for the largest portion of the traction rollers or cables 37.1, 37.2, 37.3.

Depending upon the length of the battery 10 of poultry cages 13, additional compression springs, as shown in the illustrated embodiment may be provided at appropriate intermediate locations such as, for example, the compression springs 60.12, 60.22, 60.32, in order to maintain all of the sections of the traction means uniformly and properly under pretensioning. In the illustrated arrangement, the distribution of the springs is adapted to the length of the respective traction ropes or cables 37.1, 37.2, 37.3, and the spring forces are selected in correspondence with a length of the sections of the traction ropes or cables 37.1, 37.2, 37.3 and in correspondence with a position along the length of the ropes or cables so that a smooth drive operation is obtained. The springs 60.11, 60.12, 60.21, 60.22, 60.31, 60.32 may exhibit differing spring forces, diameters, and/or spring lengths.

As shown most clearly in FIG. 1, the eccentric discs or cams 54.1, 54.2, 54.3 are attached to the jointed drive shaft 50.1, 50.2, 50.3, 50.4 with a phase shift or a uniform angular displacement of, for example, 120° with respect to each other. The couplings 52 are provided for this purpose and, with the aid of the couplings 52, the individual shaft sections 50.1, 50.2, and 50.3 may be rotated with respect to each other and then be non-rotationally connected with one another.

As also shown in FIG. 1, the upper ventilator flaps 32 of the top row 11.3 of the poultry cages 13 are in a central downwardly hanging position, and the eccentric rocking lever 55 is in a central deflected position. The central row 11.2 of the poultry cages 13 is in a position of its movement phase wherein the air ventilator flaps 32 are deflected toward the left and have just begun a return route. Thus, the springs 60.21 and 60.22 have just been relaxed to a maximum extent, and the eccentric rocking lever 55.2 has assumed its smallest distance to the jointed drive shaft and thus the position oriented most closely toward the battery 10 of poultry cage 13. The lowermost row 11.1 of the poultry cages 13 have the air ventilator flaps 32 in a phase of movement wherein the springs 60.11 and 60.12 are most strongly contracted, and the eccentric rocking lever 55.1 is deflected to a maximum extent. Accordingly, the air ventilator flaps are deflected toward the right and have already started a return route or motion. Thus, the reciprocatory motion of the ropes or cables 37.1, 37.2, 37.3 in the direction of the double headed arrow 47 results in the respective air ventilator flaps to be reciprocated between the central position substantially perpendicularly oriented with respect to the receptacle 20 and through oppositely disposed end positions respectively illustrated in rows 11.1 and 11.3 of FIG. 1.

As can readily be seen from the drawings, the various traction elements, i.e., traction ropes or cables 37.1, 37.2, 37.3, and thus the associated ventilator flaps 32 are driven with a phase shift jointly by the drive mechanism common to all of the traction elements whereby the increasing and decreasing spring forces of the springs are, in all cases, compensated so that only differential forces need to be provided by the drive mechanism. The entire system in accordance with the present invention is placed into a condition where the system swings to and fro by a relatively slow running geared motor 51 so that the vibrating forces extensively compensate one another and there is no non-uniform operation. Consequently, with the drive mechanism of the present invention, the entire battery 10 of poultry cages 13 remains in a relatively calm condition. Moreover, in spite of the use of relatively strong springs with the traction ropes or cables 37.1, 37.2, 37.3 that are frequently of a length of many meters, optimal drive result can be achieved leading to a satisfactory drying of poultry droppings on the dropping receptacle 20 with a low expenditure of energy.

With very long rows of poultry cages, the pivot drive means may also be effective from each end and be activated, for example, in each case approximately in a center of the respective long row of cages 13.

While I have shown and described several embodiments in accordance with the present invention, it is understood that the same is not limited thereto but is susceptible to numerous changes and modifications as known to one of ordinary skill in the art, and I therefore do not wish to be limited to the details shown and described herein, but intend to cover all such modifications as are encompassed by the scope of the appended claims.

I claim:

1. Drive mechanism for an air circulating system of a battery of poultry cages having a poultry dropping receptacle extending beneath the battery of cages, the air circulating system drying collected poultry droppings by air currents sweeping over the poultry dropping receptacle, and with the air circulating system including a plurality of air ventilator flaps longitudinally spaced from each other and supported on transverse axle means, the drive mechanism includes means for pivotably displacing the respective air ventilator flaps including traction means extending in a longitudinal direction of the battery of poultry cages and engaging the respective air ventilator flaps at a small distance from the transverse axle means, means for driving said traction means in a reciprocating fashion, and at least one spring means arranged at each of said traction means for normally biasing the respective traction means in a direction opposite to a driving direction provided by the means for driving.

2. A drive mechanism for an air circulating system according to claim 1, wherein the battery of poultry cages includes at least two horizontal cage rows arranged proximate to each other, the poultry dropping receptacle is arranged beneath the cage rows, said traction means being adapted to reciprocate the air ventilation flaps between a central position substantially perpendicularly disposed with respect to the receptacle and to oppositely disposed end positions.

3. A drive mechanism for an air circulating system according to claim 1, wherein the spring means includes compression springs surrounding the respective traction means.

4. A drive mechanism for an air circulating system according to claim 1, wherein at least two spring means are provided for each traction means, said spring means being spaced from each other in a longitudinal direction of the respective traction means.

5. A drive mechanism for an air circulating system according to claim 4, wherein the spring means have at least one of differing spring force, differing diameters, and differing spring lengths.

6. A drive mechanism for an air circulating system according to claim 1, wherein the means for driving further includes drive members for providing driving forces to the respective traction means in a vibrating manner.

7. A drive mechanism for an air circulating system according to claim 6, wherein the drive members include crank-style rocking levers.

8. A drive mechanism for an air circulating system according to claim 7, wherein the means for driving further includes eccentric means cooperable with the respective rocking levers.

9. A drive mechanism for an air circulating system according to one of claims 1, 3, 4, 6 or 8, further comprising means for enabling a phase shifting between the respective traction means.

10. A drive mechanism for an air circulating system according to claim 9, wherein said means for enabling a phase shifting includes an angularly adjustable coupling means disposed in a jointed drive shaft means of the means for driving.

11. A drive mechanism for an air circulating system according to one of claims 1, 3, or 4, wherein the means for driving includes drive shaft means comprising a plurality of drive shaft sections, coupling means interposed between said drive shaft sections for coupling adjacent drive shaft sections to each other, eccentric disc means provided on at least some of said drive shaft sections and cooperable with the respective traction means for imparting the reciprocating motion thereto, and geared motor means for driving said drive shaft means.

12. A drive mechanism for an air circulating system according to claim 11, wherein the coupling means are adapted to enable a phase shifting of the respective eccentric disk means with respect to each other and lock the shifted eccentric disc means in a shifted position.

13. A drive mechanism for an air circulating system according to claim 1, wherein the battery of poultry cages is arranged in at least two horizontal cage rows, each of the horizontal cage rows including a plurality of cages, and wherein the drive mechanism is interposed substantially centrally of the plurality of cages in each horizontal cage row.

14. A drive mechanism for an air circulating system according to one of claims 1, 3, 4, 6, 8 or 13, wherein the traction means includes traction ropes.

* * * * *